United States Patent
Weigert et al.

(10) Patent No.: US 12,331,440 B2
(45) Date of Patent: Jun. 17, 2025

(54) INSTALLATION AND METHOD FOR PRODUCING A SINGLE- OR MULTI-LAYER NONWOVEN

(71) Applicants: TRÜTZSCHLER GROUP SE, Mönchengladbach (DE); VOITH PATENT GMBH, Heidenheim (DE)

(72) Inventors: Thomas Weigert, Sulzbach (DE); Florian Seils, Seligenstadt (DE); Kai Pöhler, Vettweiss (DE)

(73) Assignees: TRÜTZSCHLER GROUP SE, Mönchengladbach (DE); VOITH PATENT GMBH, Heidenheim (DE)

( * ) Notice: Subject to any disclaimer, the term of this patent is extended or adjusted under 35 U.S.C. 154(b) by 242 days.

(21) Appl. No.: 17/791,853

(22) PCT Filed: Dec. 4, 2020

(86) PCT No.: PCT/EP2020/084680
§ 371 (c)(1),
(2) Date: Jul. 8, 2022

(87) PCT Pub. No.: WO2021/139933
PCT Pub. Date: Jul. 15, 2021

(65) Prior Publication Data
US 2023/0026339 A1 Jan. 26, 2023

(30) Foreign Application Priority Data

Jan. 10, 2020 (DE) .................. 102020100424.9
Sep. 1, 2020 (DE) .................. 102020122864.3

(51) Int. Cl.
*D04H 1/492* (2012.01)
*B32B 5/02* (2006.01)
(Continued)

(52) U.S. Cl.
CPC .............. *D04H 18/04* (2013.01); *B32B 5/022* (2013.01); *B32B 5/067* (2021.05); *B32B 5/266* (2021.05);
(Continued)

(58) Field of Classification Search
CPC ...... D04H 1/465; D04H 1/492; D04H 1/4374; D04H 1/49; D04H 1/498; D04H 1/4258;
(Continued)

(56) References Cited

U.S. PATENT DOCUMENTS 6,163,943 A * 12/2000 Johansson ............ D04H 1/4374
28/104
2007/0022586 A1 2/2007 Sommer et al.
(Continued)

FOREIGN PATENT DOCUMENTS

AT          300542 B     7/1972
CN       1904171 A     1/2007
(Continued)

OTHER PUBLICATIONS

International Search Report in corresponding International Patent Application No. PCT/EP2020/084680, mail date Jun. 30, 2021, 10 pages with English Translation.
(Continued)

*Primary Examiner* — Amy Vanatta
(74) *Attorney, Agent, or Firm* — FisherBroyles, LLP; Robert Kinberg

(57) ABSTRACT

The invention relates to an installation and a method for selectively producing a single- or multi-ply nonwoven includes an inclined wire former configured to deposit a sheet of wet-laid fibre material on a first circulating belt, a further belt configured to receive the sheet of wet-laid fibre material from the first circulating belt, a roller card arranged downstream in the material transport direction and config-
(Continued)

ured to introduce a roller card web into the installation, a hydroentanglement arranged downstream in the material transport direction and including at least one water beam configured to entangle, bond and/or structure a single sheet of fibres or a plurality of sheets of fibres, and a dryer arranged downstream in the material transport direction.

2 Claims, 2 Drawing Sheets

(51) Int. Cl.
  *B32B 5/06* (2006.01)
  *B32B 5/26* (2006.01)
  *B32B 37/00* (2006.01)
  *D04H 1/4374* (2012.01)
  *D04H 1/49* (2012.01)
  *D04H 1/498* (2012.01)
  *D04H 18/04* (2012.01)
  *D04H 1/4258* (2012.01)
  *D04H 1/4291* (2012.01)
  *D04H 1/4334* (2012.01)
  *D04H 1/435* (2012.01)

(52) U.S. Cl.
  CPC ...... *B32B 37/0038* (2013.01); *B32B 37/0053* (2013.01); *D04H 1/4374* (2013.01); *D04H 1/49* (2013.01); *D04H 1/492* (2013.01); *D04H 1/498* (2013.01); *B32B 2250/20* (2013.01); *B32B 2262/0253* (2013.01); *B32B 2262/0261* (2013.01); *B32B 2262/0276* (2013.01); *B32B 2262/144* (2021.05); *B32B 2317/10* (2013.01); *B32B 2323/10* (2013.01); *B32B 2367/00* (2013.01); *B32B 2377/00* (2013.01); *D04H 1/4258* (2013.01); *D04H 1/4291* (2013.01); *D04H 1/4334* (2013.01); *D04H 1/435* (2013.01); *D10B 2201/24* (2013.01); *D10B 2321/022* (2013.01)

(58) Field of Classification Search
  CPC .... D04H 18/04; D04H 1/4291; D04H 1/4334; D04H 1/435; D04H 13/00; D04H 5/03; D04H 13/003; B32B 5/067; B32B 5/266; B32B 2250/20; B32B 5/26; B32B 5/08; B32B 5/10; B32B 5/271; B32B 2250/02; B32B 2250/03; B32B 2250/04; D10B 2201/24; D10B 2321/022
  See application file for complete search history.

(56) References Cited

U.S. PATENT DOCUMENTS

| | | | |
|---|---|---|---|
| 2008/0173419 A1* | 7/2008 | Sumnicht | D21H 21/22 162/146 |
| 2013/0157537 A1 | 6/2013 | Jackson et al. | |
| 2017/0073863 A1* | 3/2017 | Collins | D04H 1/4258 |
| 2018/0282921 A1* | 10/2018 | Carlyle | B32B 5/06 |
| 2018/0303294 A1* | 10/2018 | Baker | D04H 1/435 |
| 2018/0355527 A1* | 12/2018 | Strandqvist | D21H 27/002 |
| 2020/0308743 A1* | 10/2020 | Polosa | G06K 7/1408 |
| 2021/0222335 A1* | 7/2021 | Maier | D04H 1/492 |

FOREIGN PATENT DOCUMENTS

| | | | | |
|---|---|---|---|---|
| CN | 108202515 A | | 6/2018 | |
| CN | 115418792 A | * | 12/2022 | |
| DE | 102015112955 A1 | | 10/2016 | |
| DE | 102016217401 A1 | | 10/2017 | |
| EP | 1748101 A2 | | 1/2007 | |
| EP | 1929080 B1 | | 4/2009 | |
| EP | 3118361 A1 | | 1/2017 | |
| EP | 3550062 A1 | | 10/2019 | |
| WO | 2005118934 A1 | | 12/2005 | |
| WO | 2013067557 A1 | | 5/2013 | |
| WO | WO-2019193201 A1 | * | 10/2019 | ............ D04H 1/26 |
| WO | 2019243109 A1 | | 12/2019 | |

OTHER PUBLICATIONS

German Search Report in corresponding German Patent Application No. 10 2020 122 864.3, dated Mar. 17, 2021, 20 pages with English Translation.

Chinese Office Action, dated Feb. 10, 2023 for related Chinese patent application No. 202080090090.1, 11 pages.

Partial translation of Chinese Office Action, dated Feb. 10, 2023 for related Chinese patent application No. 202080090090.1, 3 pages.

\* cited by examiner

INSTALLATION AND METHOD FOR PRODUCING A SINGLE- OR MULTI-LAYER NONWOVEN

CROSS-REFERENCE TO RELATED APPLICATIONS

This application is a United States National Stage Application of International Application No. PCT/EP2020/084680 filed Dec. 4, 2020, claiming priority from German Patent Application No. 10 2020 100 424.9 filed Jan. 10, 2020 and from German Patent Application No. 10 2020 122 864.3 filed Sep. 1, 2020.

BACKGROUND

The invention relates to an installation and a method for producing a single- or multi-ply nonwoven, and to a nonwoven produced by this method.

It is known from EP 1929080 B1 to bond loose fibres with a web, in which the loose fibres are always supported and guided from beneath by a belt and at the same time are deposited on a web. This method and the associated installation are very complex because the belts must be guided absolutely in parallel over a relatively long portion. This is very complex to implement structurally because a constant tension is required between the belts and the two belts must have an identical speed at every point so as not to introduce uncontrolled distortions into the end product.

DE 102015112955 A1 solves the above-mentioned problem by depositing the layer of loose fibres on a web.

EP 3118361 A1 discloses a roller card apparatus which is arranged upstream in the material transport direction of the installation for producing wet-laid fibres.

WO2013/067557 A1 and EP 3550062 A1 disclose the production of a wet-laid fibre material comprising pulp with solvent-spun cellulose fibres.

In wet-laid products, the tensile strength is often inadequate, so that their use in hygiene articles is possible to only a limited extent. A combination of high liquid absorption and increased tensile strength is desirable and increases the field of use.

SUMMARY

An object of the present invention is to provide an installation and a method for producing a single- or multi-ply nonwoven which is flexible in use and with which both wet-laid fibres with at least one roller card web can be processed together. It is a further object of the invention to produce a nonwoven from a wet-laid fibre material with high strength and at the same time good liquid absorption.

The above and other objects are achieved according to one aspect of the invention by the provision of an embodiment of an installation for selectively producing either a single-ply or multi-ply nonwoven, comprising: an inclined wire former configured to deposit a sheet of wet-laid fibre material on a first circulating belt for transport in a material transport direction; at least one further belt configured to receive the sheet of wet-laid fibre material from the first circulating belt; a roller card arranged downstream from the wire former in the material transport direction and configured to introduce a roller card web into the installation, wherein the at least one further belt for transporting the sheet of wet-laid fibre material is arranged at least in part beneath the roller card; a hydroentangler arranged downstream in the material transport direction and including at least one water beam configured to one of entangle, bond and structure a single sheet of fibres or a plurality of sheets of fibres; and a dryer arranged downstream in the material transport direction.

According to this exemplary embodiment, the installation is configured to process the wet-laid sheet of fibre material or the roller card web or alternatively the sheet of fibre material with the roller card web. It is thereby not necessary to deposit the wet-laid sheet of fibre material upside down on a transport belt or a web. Preferably, the wet-laid sheet of fibre material can be processed either alone or in combination with the roller card web. The installation is so flexible that, by switching off the inclined wire former, only the roller card web is entangled and/or structured in the hydroentangler. The deposition of the sheet of fibre material and the possible combination thereof with a further roller card web is so configured that no distortion is exerted on the single sheet or on the multi-ply sheet.

Preferably, the sheet of fibre material can be transported by means of the at least one belt directly to the hydroentangler. The arrangement of the inclined wire former and the roller card is such that they can both produce a single-ply nonwoven independently of one another. The single-ply nonwoven can consist of the sheet of fibre material, which can be of either single-layer or multi-layer form, or alternatively only of the roller card web.

Preferably, the inclined wire former is arranged first in the material transport direction, followed by the roller card apparatus. Advantageously, the belt for transporting the sheet of fibre material is arranged at least in part beneath the roller card. The belt can thereby be guided under the floor or can be arranged between the supports of the roller card.

An addition to this installation configuration provides that there is arranged upstream of the inclined wire former in the transport direction of the sheet of fibre material or beneath the inclined wire former an unwinding station with which, alternatively to the sheet of fibre material, a further first web can be introduced into the installation. The roller card web can thus be combined with a further first web which consists, for example, of long fibres with a fibre length, processing of which with an inclined wire former is not expedient. Instead of the unwinding station, a further roller card apparatus can be arranged upstream of the inclined wire former in the transport direction of the web.

The installation is preferably configured to produce a two-ply nonwoven, which can consist of the sheet of fibre material with the roller card web or with the further first web.

The installation is preferably configured to produce a three-ply nonwoven, which can consist of the sheet of fibre material with the roller card web and further first web.

The method according to the invention for producing a single- or multi-ply nonwoven provides that a sheet of wet-laid fibre material and/or a web and/or a roller card web is deposited on a circulating belt and, alone or in combination with one of the above-mentioned sheets of fibre material or webs, is supplied in the form of a single- to three-ply nonwoven to a hydroentangler for bonding and/or entangling and/or structuring and is subsequently dried. The deposition of the sheet of fibre material and the possible combination thereof with a further roller card web is so configured that no distortion is exerted on the single sheet or on the multi-ply sheet. This requires a higher strength of the fibre material, which is achieved by combining or mixing the wet-laid fibre material, which usually consists of pulp, with a proportion of from 30% by weight to 5% by weight solvent-spun cellulose fibres, for example with lyocell. The combination of the wet-laid pulp fibres with the solvent-spun cellulose fibres, for example of lyocell, increases the wet strength of the fibre material by over 60%, since the fibrils of the solvent-spun cellulose fibres surprisingly enter into a high degree of bonding with the short pulp fibres. The increased wet strength of the fibre material permits further processing in the installation without enclosing the fibre material or guiding it by a second sheet. Unlike material combinations of the prior art, solvent-spun cellulose fibres as short-cut fibres can likewise have a shorter fibre length than is usually used. The average fibre length of the solvent-spun cellulose fibres of from 8 to 12 mm with a titre of from 1.2 to 1.8 dtex has been found to be ideal for use in a wet-laid process. Owing to the high bonding capacity of the solvent-spun cellulose fibres with the pulp, the pulp load of the filtration means of the installation is reduced, which increases the efficiency of the installation and of the method. The method according to the invention has the advantage that very lightweight fibre materials of, for example, 25 g/m$^2$ or less can be produced, which have high strength and can thus be transferred from one transport belt to the next without being damaged.

The hydroentangler is configured to entangle, bond and/or structure a single web or a plurality of layers of fibres or a plurality of webs. The water beams of the hydroentangler are preferably configured to spray the water onto the fibre sheet at a pressure of from 40 to 400 bar. By means of a specially configured nozzle assembly or in combination with an upper structured belt with which the sheet of fibre material is enclosed, structuring and thus a pattern-giving surface of the web is possible. Alternatively, entangling and structuring can also be carried out on a cylinder (not shown) which is fitted with a structured jacket and is arranged upstream of the dryer.

There is obtained a very flexible installation in which different fibres with different fibre lengths in different weights per unit area can be introduced and processed individually or together. The arrangement of an inclined wire former and a roller card arranged downstream in the material transport direction is space-saving and, because the transport belt is guided beneath the roller card, is simple and inexpensive to implement. Part of the transport belt can, for example, be arranged concealed under the floor.

The nonwoven according to the invention comprises a wet-laid fibre material which consists of from 70% by weight to 95% by weight pulp and from 30% by weight to 5% by weight solvent-spun cellulose fibres, for example lyocell. The combination of the wet-laid pulp fibres with the solvent-spun cellulose fibres increases the wet strength of the nonwoven by over 60%, since the fibrils of the solvent-spun cellulose fibres surprisingly enter into a high degree of bonding with the short pulp fibres. Owing to the water absorbing capacity of the solvent-spun cellulose fibres, there is thereby created an ideal combination with the pulp for permitting high liquid absorption when used as the middle or bottom layer for hygiene products or nappies/diapers. Unlike material combinations of the prior art, the solvent-spun cellulose fibres likewise have a shorter fibre length than is usually used. The average fibre length of the solvent-spun cellulose fibres, for example lyocell, of from 8 to 12 mm with a titre of from 1.3 to 1.8 dtex has been found to be ideal for use in a wet-laid process. Owing to the high bonding capacity of the solvent-spun cellulose fibres with the pulp, the pulp load of the filtration means of the installation is reduced, which increases the efficiency of the installation and of the method.

The wet-laid fibre material can preferably be bonded with one or two plies of a further web, which enclose the wet-laid fibre material as cover layers. At least one web is thereby in the form of a roller card web which consists of 100% by weight solvent-spun cellulose fibres, or 100% by weight viscose, or 100% by weight of a mixture of solvent-spun cellulose fibres and viscose. The second web likewise consists of 100% by weight solvent-spun cellulose fibres, or 100% by weight viscose, or 100% by weight of a mixture of solvent-spun cellulose fibres and viscose. The solvent-spun cellulose fibres preferably have an average fibre length of from 38 to 40 mm with a titre of from 1.2 to 1.8 dtex, whereby they differ from the solvent-spun cellulose fibres that are used in the wet-laid process. The viscose fibres likewise preferably have an average fibre length of from 38 to 40 mm with a titre of from 1.2 to 1.8 dtex. A further advantage of the combination of the above-described fibre material 9 with a roller card web 15a of solvent-spun cellulose fibres is that the resulting hygiene product is fully biodegradable. For the operator of the installation, a cost optimisation can be achieved with similar properties, depending on the availability and world market price of viscose and/or lyocell, Tencel, Cocel etc., in that the nonwovens that are produced, which enclose the fibre material as a cover layer, can consist only of solvent-spun cellulose fibres, or only of viscose, or of a mixture of the two.

BRIEF DESCRIPTION OF THE DRAWINGS

Further measures enhancing the invention are described in detail below together with the description of a preferred exemplary embodiment of the invention with reference to the Figures, wherein.

DETAILED DESCRIPTION

Figure 1:
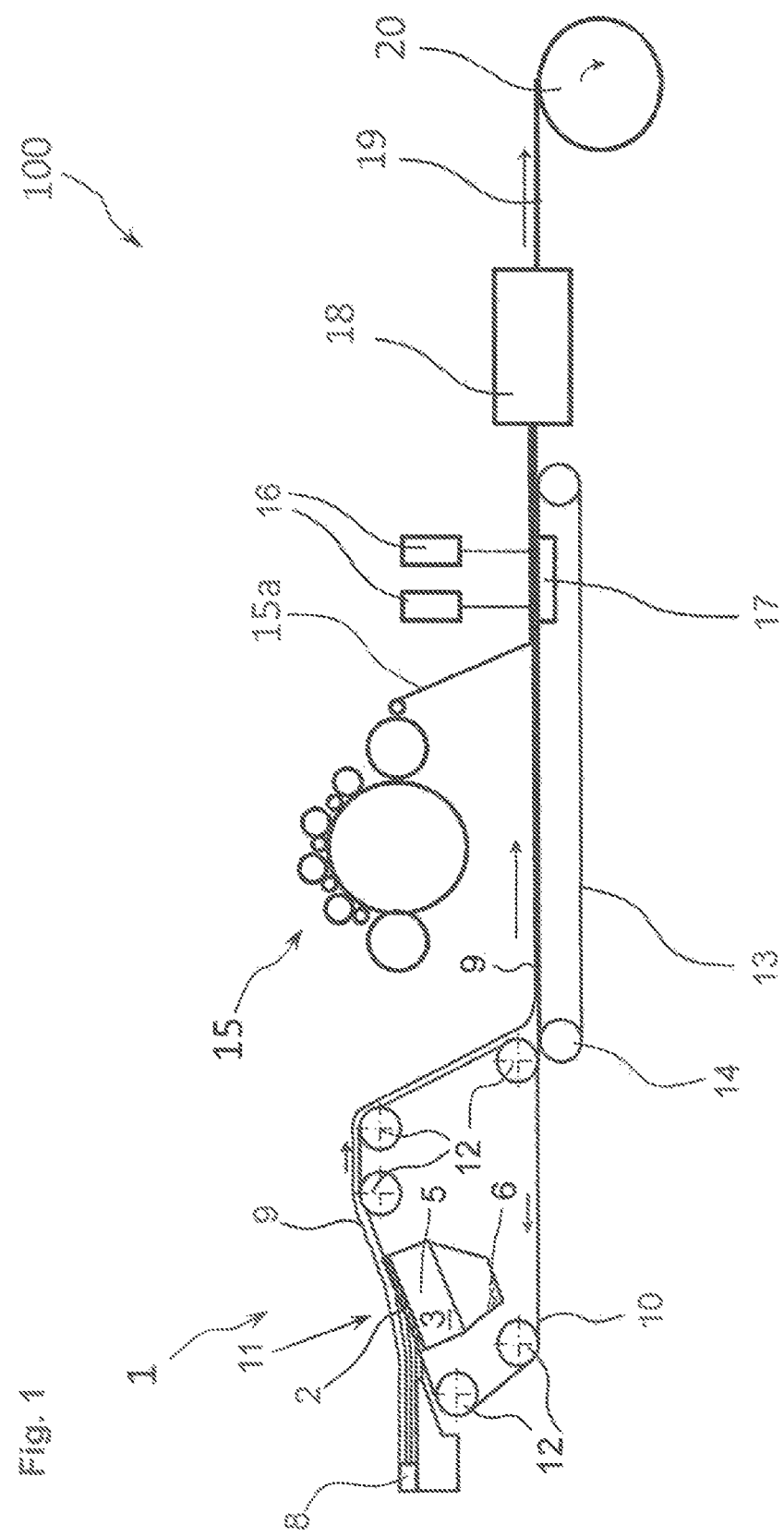
FIG. 1 shows a first embodiment of the installation according to the invention and of the method.

The installation 100 according to the invention comprises at least one inclined wire former 1, at least one device, arranged downstream in the transport direction of the web, for introducing a further web, at least one hydroentangler which is arranged downstream and has at least one water beam 16, and a dryer 18.

An inclined wire former 1 is arranged beneath a circulating perforated belt 10. The perforated belt 10, which can be in the form of an endless belt, passes around various rolls 12 and has a sloping portion 11 which ascends at an angle in the running direction of the perforated belt. The inclined wire former 1, on the covering 2 of which the perforated belt 10 is supported, is arranged in the region of the sloping portion 11, beneath the perforated belt 10. Beneath the covering 2 there is arranged at least one suction zone 3 which is placed under low pressure by means of pumps (not shown). The inclined wire former 1 can have a plurality of suction zones 3 which are subjected to different pressures or low pressures. The low pressure sources can preferably be in the form of controllable/adjustable vacuum pumps.

In this exemplary embodiment, at least one fibre suspension is applied to the perforated belt 10 via a headbox 8. The fibre suspension contains, in addition to water, a specific amount of solid material, which in turn consists of fibres and other added materials. In the case of a plurality of fibre suspensions, plates (not shown) are arranged between them, with which the layer thickness of the fibre suspensions can be varied individually or in total. Since the plates separate the fibre suspensions from one another, the fibre suspensions are dewatered on the inclined wire former 1 one after the other. Mixing of the fibre suspensions is thereby prevented and the ply purity of the individual layers of fibre material is improved. Via the at least one suction zone in conjunction with the controllable/adjustable vacuum pumps, each layer of a fibre suspension can be exposed to a separate low pressure, whereby different mixtures of water with fibres in each fibre suspension can be processed.

In this exemplary embodiment, the fibre suspension consists of pulp with a proportion of from 5% by weight to 30% by weight lyocell. The pulp has an average fibre length of from 1 to 3 mm with a titre of from 1.1 to 1.8 dtex. The lyocell has an average fibre length of from 8 to 12 mm with a titre of from 1.2 to 1.8 dtex. Compared to the prior art, the tensile strength of the fibre material 9 can be increased by the addition of the lyocell. A further advantage is the decreasing pulp load of the filtration means. Surprisingly, this is due less to the reduction in the proportion of pulp with the same weight per unit area and rather to the bonding action between the lyocell fibres and the pulp. Unlike viscose fibres, lyocell fibres have fibrils with which the short pulp fibres are bound or held in the aqueous solution.

In a test, the tensile strength in the case of 100% by weight pulp with a weight per unit area of 25 $g/m^2$ in the cross-machine direction (CD) was 12 N/5 cm. All the strength values given here relate to a test in accordance with EDANA WSP 110.4 (09). In the case of a fibre mixture of 90% by weight pulp and 10% by weight lyocell, the strength increased on average to 14 N/5 cm, up to a maximum of 16 N/5 cm. In the case of a fibre mixture of 80% by weight pulp and 20% by weight lyocell, the strength increased on average to 18 N/5 cm, even up to a maximum of 20 N/5 cm. The increase of the mixture is advantageously limited to 70% by weight pulp with 30% by weight lyocell, because the fibre material 9 then no longer has the necessary absorption capacity for liquid that is necessary for use as a nappy/diaper liner or a hygiene article. The weight per unit area of the dry sheet of fibre material 9 can preferably be from 10 to 60 $g/m^2$. Instead of lyocell, a different solvent-spun cellulose fibre, for example Tencel, can also be used.

The perforated belt 10, which is permeable to liquids and gases, transports the fibre suspension over the sloping portion 11 over the inclined wire former 1. Owing to gravity and the low pressure acting on the fibre suspension, the fibre suspension is dewatered, whereby in this example a sheet of fibre material 9 with one ply of fibres is formed. Beneath the suction zone 3, the white water 6 is collected in a screen box 5 and removed. The sheet of fibre material 9 is transported on the belt 10 in the direction indicated by the arrow, first over a horizontal portion and then further over a descending sloping portion. After the descending sloping portion, the sheet of fibre material 9 is transferred by its underside onto a further circulating belt 13, which passes in the form of an endless belt around at least two rolls 14.

In the transport direction of the sheet of fibre material 9, a roller card 15 is arranged in the installation 100 in the first exemplary embodiment of FIG. 1. The roller card 15 is arranged spatially above the belt 13, so that the wet-laid sheet of fibre material 9 can be guided independently of the roller card 15 to a hydroentangler having at least one water beam 16 and a suction means 17 arranged beneath the belt 13. Or, in other words, the belt 13 is guided beneath the stationarily installed roller card 15 and is configured to guide the sheet of fibre material 9 directly from the inclined wire former to the hydroentangler. The fibre material 9 is thereby entangled, dried in the dryer 18 and optionally wound in a winding station 20.

The roller card 15 can introduce a carded web of fibres, a roller card web 15a, into the installation 100. This takes place upstream of the hydroentangler, so that the sheet of fibre material 9 is bonded with the roller card web 15a by means of the water beams 16. The sheet of fibre material 9 can be bonded by the hydroentangler with a cover layer of a roller card web 15a to form a multi-ply nonwoven 19, which can be dried in the dryer 18 and optionally wound in a winding station. The roller card web 15a can usually consist, for example, of polyester, viscose, a cotton mixture or a mixture of synthetic and/or natural fibres. Preferably, the weight per unit area of the roller card web 15a is from 20 $g/m^2$ to 60 $g/m^2$.

Advantageously, the roller card web consists of 100% by weight viscose, or of 100% by weight solvent-spun cellulose fibres, for example of lyocell or Tencel, or of 100% by weight of a mixture of both fibres. The advantage of these usable materials as the cover layer for the fibre material 9 is the high absorbency and the soft feel (soft denim) when used as hygiene articles. A further advantage in the case of the combination of the above-described fibre material 9 with a roller card web 15a of solvent-spun cellulose fibres is that the resulting hygiene product is fully biodegradable. For the operator of the installation, a cost optimisation can be achieved with similar properties, depending on the availability and world market price of viscose and/or lyocell, Tencel, etc., in that the carded web 15a can consist only of solvent-spun cellulose fibres, or only of viscose, or of a mixture of the two. The lyocell fibres used here preferably have an average fibre length of from 38 to 40 mm with a titre of from 1.2 to 1.8 dtex. The viscose fibres likewise preferably have an average fibre length of from 38 to 40 mm with a titre of from 1.2 to 1.8 dtex. The viscose fibres likewise preferably have an average fibre length of from 38 to 40 mm with a titre of from 1.2 to 1.8 dtex.

The roller card web preferably has a weight per unit area of 20 $g/m^2$, so that the entangled and dried nonwoven 19 has a weight per unit area of preferably 45 $g/m^2$.

According to this exemplary embodiment, the installation is configured to process the sheet of fibre material 9 or the roller card web 15a or alternatively the sheet of fibre material 9 together with the roller card web 15a. A two-ply nonwoven with a weight of 45 $g/m^2$ is preferably produced, in which the ply of fibre sheet 9 consists of from 70% by weight to 95% by weight pulp and from 30% by weight to 5% by weight solvent-spun cellulose fibres. The second ply of roller card web 15a can consist of 100% by weight solvent-spun cellulose fibres, of 100% by weight viscose, or of 100% by weight of a mixture of solvent-spun cellulose fibres with viscose.

Figure 2:
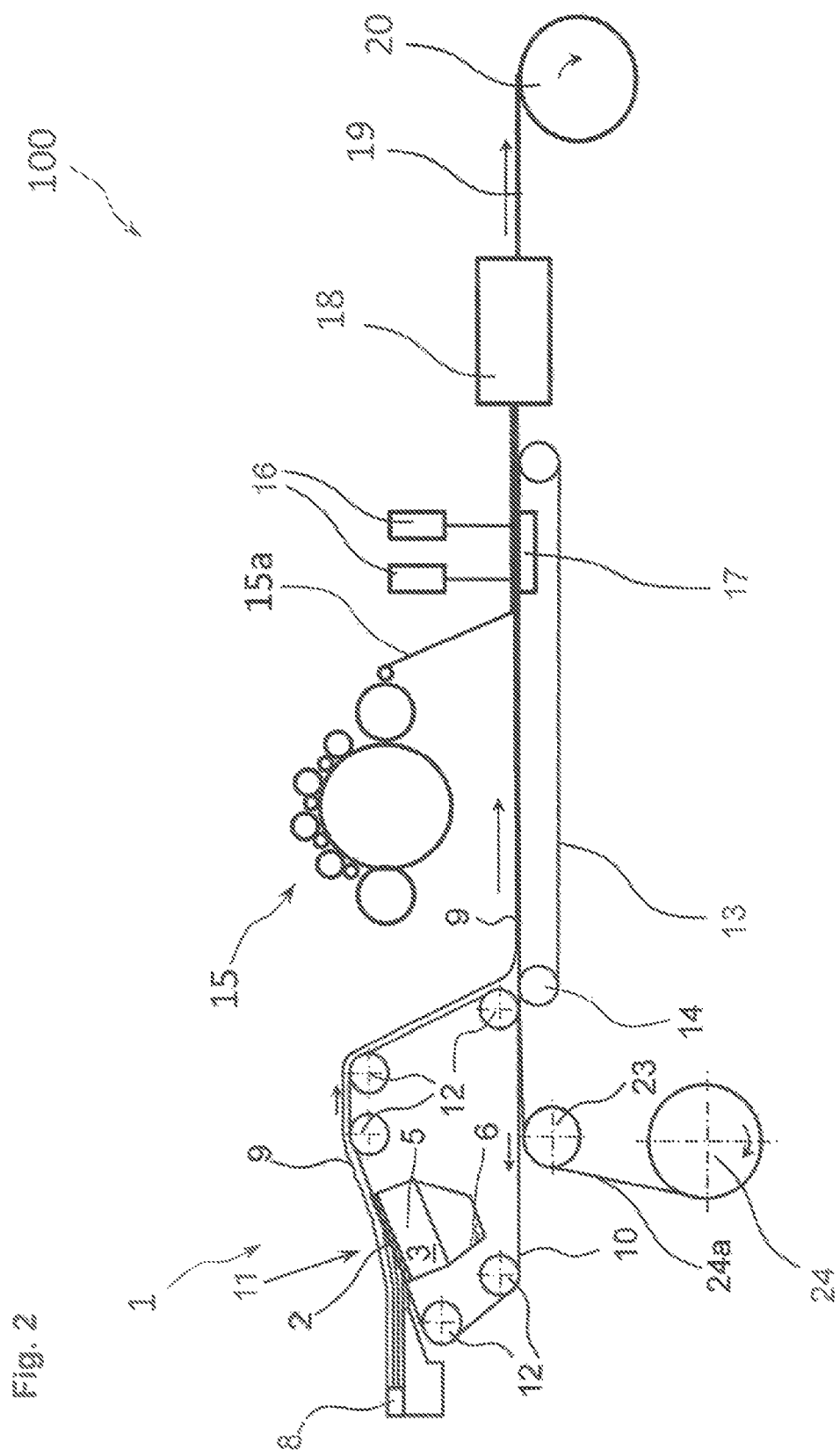
FIG. 2 shows a second embodiment of the installation according to the invention and of the method.

In the exemplary embodiment of FIG. 2, compared to the exemplary embodiment of FIG. 1, an unwinding station 24 with a roll 23 is additionally arranged upstream of the belt 13 in the transport direction of the sheet of fibre material 9. The unwinding station 24 can be arranged upstream of the inclined wire former 1 or beneath it (under the floor) and can introduce into the installation 100, alternatively or in addition to the roller card web 15a, a web of fibres as a web 24a. Instead of the unwinding station 24, a further roller card can also be arranged upstream of the inclined wire former 1, the roller card web of which further roller card is introduced into the installation 100 beneath the inclined wire former 1.

Contrary to the schematic representation of the arrangement of the unwinding station 24 and the running direction of the sheet 10 in FIG. 2, the unwinding station 24 can be so arranged in this exemplary embodiment that the web 24a is deposited on the belt 13 between the deposition of the sheet of fibre material 9 and the roll 14. A three-ply nonwoven 19 is thus possible, wherein the web 24a and the roller card web 15a form the cover plies for the sheet of fibre material 9. The roller card web 24a preferably likewise consists of 100% by weight viscose, or of 100% by weight solvent-spun cellulose fibres, or of 100% by weight of a mixture of both fibres. The solvent-spun cellulose fibres preferably have an average fibre length of from 38 to 40 mm with a titre of from 1.2 to 1.8 dtex. The viscose fibres likewise preferably have an average fibre length of from 38 to 40 mm with a titre of from 1.2 to 1.8 dtex.

The roller card web preferably has a weight per unit area of 20 g/m², so that the entangled and dried three-ply nonwoven 19 has a weight per unit area of preferably 65 g/m².

If the web 24a is fed into the installation 100 as an alternative to the sheet of fibre material 9, a web of tissue or paper can also be used. The weight per unit area of the web 24a is then preferably from 10 g/m² to 60 g/m².

According to this exemplary embodiment of FIG. 2, the installation is configured to produce a two- or three-ply nonwoven 19, which can consist of the sheet of fibre material 9 with a roller card web 15a on the upper side and optionally a roller card web 24a on the lower side. The installation 100 is thereby so configured that there is no overlapping of belts between which distortion of the nonwoven is possible owing to differences in speed, or such belts run in parallel.

REFERENCE SIGNS

100 installation
1 inclined wire former
2 covering
3 suction zone
5 suction box
6 white water
8 headbox
9 fibre material
10 perforated belt
11 sloping portion
12 roll
13 belt
14 roll
15 roller card
15a roller card web
16 water beam
17 suction means
18 dryer
19 nonwoven
23 roll
24 unwinding station
24a web

The invention claimed is:

1. A method for producing a two-ply or three-ply nonwoven comprising:
   producing in an inclined wire former a web of wet-laid fibrous material consisting of 70%-95% by weight of pulp and 30%-5% by weight of solvent-spun cellulose fibers; and
   selectively forming the two-ply non-woven by performing one of the following steps (A) and (B) or forming the three-ply nonwoven by performing both of the following steps (A) and (B):
      (A) depositing a carded nonwoven on the web of wet-laid fibrous material from a card arranged above and downstream in a material transport direction from the inclined wire former; and
      (B) introducing a further web on the web of wet-laid fibrous material from either an unwinding station or a further card located upstream of or below the inclined wire former;
   wherein each of the carded nonwoven and the further web in steps (A) and (B) consist of 100% by weight of solvent-spun cellulose fibres, or 100% by weight of viscose or 100% by weight of a mixture of solvent-spun cellulose fibres and viscose;
   feeding the two-ply or three-ply nonwoven to a hydroentangler for at least one of bonding, entangling and structuring the plys of the two-ply or three-ply nonwoven; and
   subsequently drying the two-ply or three-ply nonwoven.

2. The method according to claim 1, comprising using the hydroentangler to at least one of entangle, bond and structure the wet-laid fibre material together with at least one of the roller card web and the further web at a pressure of from 40 bar to 400 bar.

* * * * *